United States Patent [19]

Stevens et al.

[11] 4,074,592

[45] Feb. 21, 1978

[54] DIRECT DRIVE TRANSMISSION WITH HYDRAULICALLY ACTUATED FORWARD AND REVERSE CLUTCHES

[75] Inventors: W. Gene Stevens, Dunlap; Willis E. Windish, Pekin, both of Ill.

[73] Assignee: Caterpillar Tractor Co., Peoria, Ill.

[21] Appl. No.: 681,661

[22] Filed: Apr. 29, 1976

[51] Int. Cl.² ............................................. F16H 37/04
[52] U.S. Cl. ........................................ 74/740; 74/753; 74/764
[58] Field of Search ..................... 74/15.66, 15.86, 740, 74/764, 765, 768, 769

[56] References Cited

U.S. PATENT DOCUMENTS

| | | | |
|---|---|---|---|
| 2,787,919 | 4/1957 | Senkowski et al. | 74/740 |
| 2,838,940 | 6/1958 | Swenson et al. | 74/740 |
| 3,264,902 | 8/1966 | Breting et al. | 74/740 |
| 3,298,252 | 1/1967 | Harris et al. | 74/761 |
| 3,352,166 | 11/1967 | Marquart et al. | 74/15.84 |
| 3,354,729 | 11/1967 | Marquart | 74/15.84 |
| 3,774,460 | 11/1973 | Browning et al. | 74/740 |
| 3,774,474 | 11/1973 | Recker et al. | 74/740 |
| 3,774,475 | 11/1973 | Meysenburg et al. | 74/740 |

*Primary Examiner*—Stephen C. Bentley

*Attorney, Agent, or Firm*—Phillips, Moore, Weissenberger, Lempio & Majestic

[57] ABSTRACT

A vehicle transmission couples a plurality of input driven planetary arrangements with a plurality of selectable direct drive gear reduction means. The plurality of input driven planetary arrangements include a reverse planetary gear arrangement and in the preferred embodiment two forward planetary gear arrangements. The two forward planetary gear arrangements, each of which includes a ring gear which may be stopped, share a common planet carrier which drives the selectable direct drive gear reduction means. The reverse planetary gear arrangement includes a planet carrier which may be stopped, thus an associated reverse ring gear rotates in an opposite direction relative the input shaft. The reverse ring gear is coupled to the common planet carrier of the forward planet section. The direct drive section includes three drive gears in the preferred embodiment rotatably mounted on a quill shaft driven by the common planet carrier and coaxially mounted about the input shaft. Three driven gears are drivingly mounted on an output shaft, each intermeshing with a driving gear. Drive engagement devices are included to selectively engage one of the drive gears with the quill shaft.

5 Claims, 4 Drawing Figures

DIRECT DRIVE TRANSMISSION WITH HYDRAULICALLY ACTUATED FORWARD AND REVERSE CLUTCHES

BACKGROUND OF THE INVENTION

The present invention relates to a direct drive transmission for heavy equipment and more particularly relates to a multi speed transmission with a two speed underway shift capability coupled with a plurality of speed gears engageable while the vehicle is stopped to provide varying power output and speed combinations. A reverse section is also provided which may be coupled through the plurality of speed gears.

Vehicle transmissions take many forms, each form generally dictated by the use of which the vehicle is put. In many vehicles, a wide speed range is important, consequently a multitude of possible underway shifts must be provided to take the vehicle from a stopped condition to the maximum and relatively high speed. In some cases this underway shift capability is in part avoided through the use of a torque converter. On the other hand, some vehicles require minimum underway shift capability as they operate at relatively constant and slow speeds or through a relatively small range of speeds. In these vehicles, the primary purpose of a transmission is to provide maximum power output over a relatively small range of output speeds.

In all cases, the goal is to operate the vehicle engine at its most efficient speed. Such a goal is, of course, unobtainable when the vehicle must be taken from a stopped condition to an underway condition, or similarly pass from a forward direction to a reverse direction. Accordingly, a compromise must be reached in the transmission to allow for varying speed conditions with a minimum deviation from optimum operating speed of the engine.

Use of a torque converter can provide some of this capability, however torque converters generally are inefficient at high input and low output speeds and thus are not adaptable to use in certain types of construction equipment. At the opposite end of the scale is a direct drive gear arrangement in which a minimum amount of friction loss occurs and a maximum amount of power transmission may take place. Unfortunately, a direct drive gear arrangement requires either a complex clutching assembly to engage the input and the output members while underway or the drive train must be engaged before the associated input and output shafts are rotated.

Planetary gear arrangements, which include a driving member, a reaction member and a driven member, have been found to be useful. Such an arrangement operates without severe friction losses while providing discrete reduction ratios similar to a direct drive gear arrangement. Furthermore, a planetary transmission allows the reaction member to be stopped or interconnected with another rotating member through the use of clutches or brakes without requiring the input and output members of the planetary gear arrangement to be stopped. Thus the underway clutching requirements for direct drive gearing previously mentioned are reduced. In addition to these advantages, it is well-known that in a typical planetary gear arrangement which includes a sun gear, or planet carrier having a plurality of planet gears mounted thereon and intermeshing with a sun gear and a ring gear intermeshing with a planet gear, when utilizing the planet carrier as the reaction member, the direction of rotation of the output member is reversed relative the input member. Thus planetary arrangements provide a compact reduction and reversing capability not found in other arrangements.

Combinations of direct drive gear arrangements and planetary arrangements provide a transmission with the best features of both arrangements. Such combination transmissions are particularly appropriate to the construction type vehicle to provide limited output speed range at or near maximum engine efficiency.

SUMMARY OF THE INVENTION

Accordingly, the present invention provides a transmission which couples a plurality of planetary gear arrangements including a reverse planetary gear arrangement with a plurality of selectable direct drive gear reduction means. In particular, the present invention includes a directional planetary gear arrangement and a pair of forward gear arrangements all driven by the input shaft, to selectively drive a coaxially mounted quill shaft at two forward output speeds or a single reverse speed. A plurality of selectable direct drive gear reduction means are associated with this quill shaft and in turn with an output shaft.

Specifically it is an object of this invention to provide a direct drive transmission having an underway shift capability coupled with a multi range speed section.

It is another object of this invention to provide a transmission which accomplishes the preceding object and which includes a reverse capability.

It is still another object of this invention to provide a direct drive transmission which while fulfilling the above objects includes a power take off shaft directly coupled to the input shaft.

It is still another object of this invention to provide a transmission with a minimum amount of parallel shafting.

It is still another object of this invention to provide a transmission of simple and economical construction.

It is also an object of this invention to provide a transmission which fulfills the above objects and utilizes a minimum space in the associated vehicle.

Briefly stated, the transmission is for an engine driven vehicle and comprises a housing having an input shaft journalled in the housing and driven by the vehicle engine. A reverse planetary section is provided and includes a reverse sun gear drivingly mounted on the input shaft. The associated reverse planet carrier is rotatable about the input shaft and has rotatably mounted thereon a plurality of reverse planet gears in intermeshing relation with the reverse sun gear. A reverse ring gear intermeshes with the reverse planet gears. A reverse brake means is provided and is selectively actuable to stop rotation of the reverse planet carrier. A plurality of planetary gear arrangements is also provided and includes a common planet carrier drivingly coupled with the reverse ring gear. Each individual planetary gear arrangement includes a sun gear drivingly mounted on the input shaft, a plurality of planet gears each rotatingly mounted on the common planet carrier and a ring gear. A brake means is provided for each planetary gear arrangement for selectively stopping rotation of the ring gear so that the common planet carrier rotates at a predetermined speed relative the input shaft. An intermediate quill shaft is coaxially mounted about the input shaft and is driven by the common planet carrier. An output shaft is journalled in the housing in substantially parallel relation to the input shaft. A plurality of speed change means, each associated with the output shaft and selectively engageable with the intermediate quill shaft is provided to rotate the output shaft at predetermined speeds relative the intermediate quill shaft.

These and other objects of the invention will become apparent from a study of the following specification and the accompanying drawings.

DESCRIPTION OF THE PREFERRED EMBODIMENT

Figure 1:
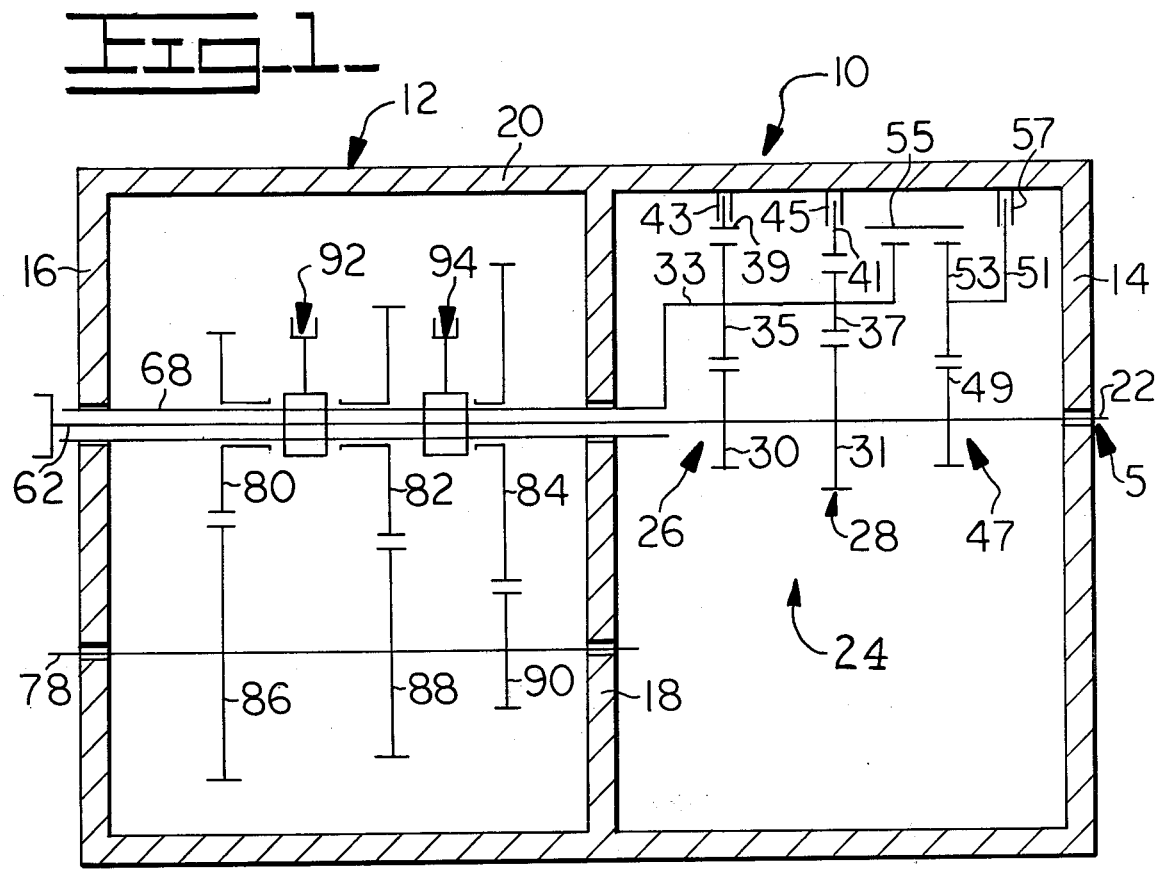
FIG. 1 is a schematic diagram of a transmission which is in accord with this invention.
Figure 2:
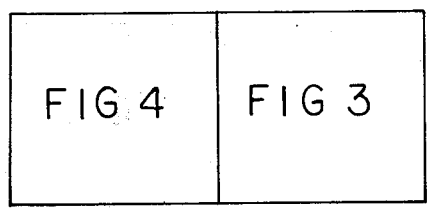
FIG. 2 is the relationship between FIGS. 3 and 4.

Reference is made to FIG. 1 wherein a schematic diagram of a transmission in accord with this invention is shown. The transmission is contained in a housing 12 comprised of a first wall 14, a second wall 16 and a mid wall 18, disposed between the first and second wall. The first wall, second wall and mid wall extend generally perpendicularly from a casing 20 which with the first and second wall substantially encompasses the transmission. Casing 20 is depicted schematically only in FIG. 1 and reference to FIGS. 3 and 4 wherein a particular embodiment is shown will indicate that casing 20 is a composite of several elements forming an exterior wall of the transmission. Reference is made here to a casing for convenience sake only.

Journalled in first wall 14 second wall 16 and mid wall 18 is an input shaft means 5 including input shaft 22 which is driven by a vehicle engine proximate first wall 14. A plurality of planetary gear arrangements 24 are drivingly associated with input shaft 22, which in the preferred embodiment comprise a low range planetary gear arrangement 26 and a high range planetary gear arrangement 28. The low range planetary gear arrangement and the high range planetary gear arrangement each include an input member such as sun gear 30 and sun gear 31 each respectively drivingly mounted on input shaft 22.

The low range and high range planetary gear arrangements share a common planet carrier 33 on which a plurality of low range planet gears 35 and high range planet gears 37 are rotatingly mounted. A low range ring gear 39 is in intermeshing relationship with the low range planet gears 35 which in turn intermesh with the low range sun gear 30. A high range ring gear 41 is in intermeshing relationship with high range planet gears 37 which is turn intermesh with high range sun gear 31. The low range planetary gear arrangement is provided with a ring gear brake means 43 selectively actuable to stop rotation of low range ring gear 39. A similar high range brake means 45 is selectively actuable to stop rotation of the high range ring gear. Appropriate selection of the gear ratios in low range planetary gear arrangement 26 and high range planetary gear arrangement 28 provide the desired reduction ratios in the plurality of planetary gear arrangements. It should be understood that additional planetary gear arrangements could be added to the planetary gear section just described utilizing the same common planet carrier 33 to provide additional underway speed changes.

Mounted adjacent to the plurality of planetary gear arrangements and proximate the first wall 14 is a directional planetary gear arrangement 47. The directional planetary gear arrangement 47 serves not only to reverse rotation but also to provide a reduction ratio in the reverse range. Directional planetary gear arrangement 47 includes a reverse sun gear 49 drivingly mounted on input shaft 22. A reverse planet carrier 51 is rotatingly mounted about the input shaft and has rotatingly mounted thereon a plurality of reverse planet gears 53 each intermeshing with the reverse sun gear. A reverse ring gear 55 intermeshes with a plurality of reverse planet gears 53. A reverse planet carrier brake means 57 is selectively actuable to stop rotation of the reverse planet carrier so that reverse ring gear 55 is driven in a direction opposite of the input shaft. Reverse ring gear 55 also serves to provide a means of interconnecting reverse ring gear 55 with common planet carrier 33. Such a connection is provided through the toothed perimeter of a flange 60 integrally formed with common planet carrier 33, (see FIG. 3). The toothed or splined perimeter intermeshes with the gear teeth of ring gear 55, thus when reverse brake means 57 is actuated, the reverse ring gear serves to rotate the common planet carrier through the aforedescribed connection.

Figure 3:
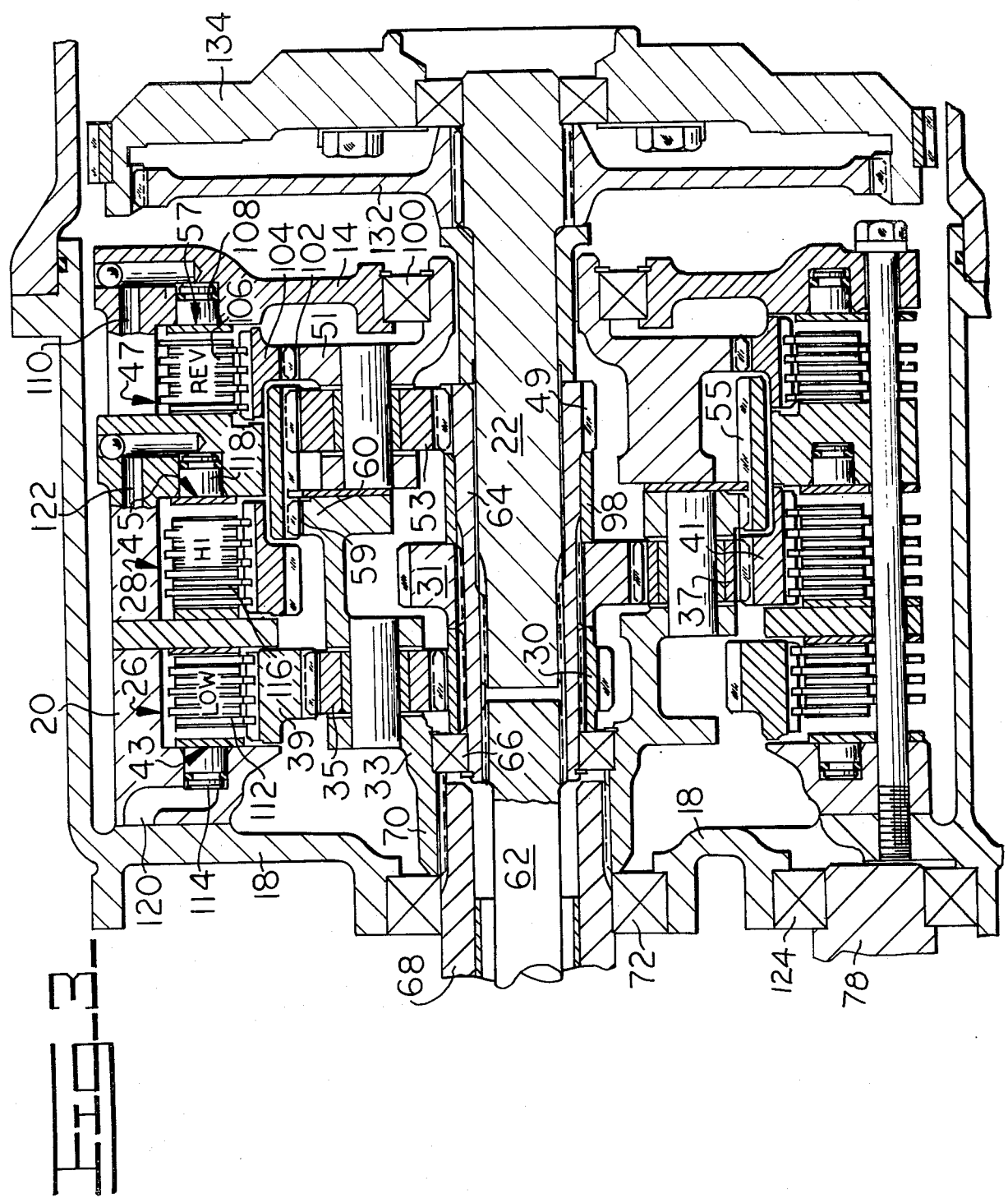
FIG. 3 is the planetary portion partly in section of a particular embodiment of this invention.

Input shaft 22 as shown in FIG. 3 is interconnected with a power take off shaft 62 by means of a splined sleeve coupling 64 which has integrally formed therewith the reverse sun gear 49. Common planet carrier 33 is supported in the vicinity of the juncture of power take off shaft 62 and input shaft 22 by a bearing means such as bearing 66. A quill shaft 68 is coaxially mounted about the power take off shaft 62 and has formed at the end adjacent the common planet carrier 33 a splined exterior perimeter adapted to fit a similarly splined interior of extension 70 of common planet carrier 33. Thus the quill shaft is drivingly interconnected with the common planet carrier and rotates therewith. The quill shaft is supported at mid wall 18 by a bearing 72 mounted in the mid wall. The quill shaft is supported at second wall 16 by a similar bearing 74. A bearing 76 supports the power take off shaft 62 in the second wall exterior of bearing 74. Thus the quill shaft is free to rotate about the power take off shaft 62 as driven by common planet carrier 33.

Quill shaft 68 has rotatingly mounted thereon a plurality of drive gears, each of which form a portion of a plurality of speed changing means. Mounted in housing 12 adjacent to and substantially parallel to quill shaft 68 is an output shaft 78 having mounted thereon a plurality of driven gears, which form a second portion of the plurality of speed changing means. The third portion of the plurality of speed changing means comprises drive engagement devices to drivingly associate a drive gear with the quill shaft wherein the driven gear is drivingly rotated to turn the output shaft. In particular, in the illustrated embodiment, as schematically shown in FIG. 1, the drive gears are a low range drive gear 80, a mid range drive gear 82 and a high range drive gear 84. The driven gears include a low range driven gear 86, a mid range driven gear 88 and a high range driven gear 90. Drive engagement devices selectively engage the drive gears with the quill shaft 68 and enable a power train to be established through the transmission prior to engagement of one of the planetary gear arrangements described above.

The drive engagement devices in the direct drive section of this transmission in the embodiment here illustrated include a low range clutch 92 and a high range clutch 94. The low and high range clutches are of the sleeve type wherein the sleeve is splined to the quill shaft 68 to allow engagement with a sliding collar on the appropriate rotating drive gear. In particular low range clutch 92 is movable in a first direction to engage drive gear 80 with quill shaft 68 and movable in a second direction to engage drive gear 82 with quill shaft 68. The high range clutch 94 is movable in one direction to engage high range drive gear 84 with quill shaft 68. It should be apparent to those skilled in the art that an additional gear ratio could be provided in the direct drive section herein described without the addition of a third clutch means. Such additional gearing would be engaged with quill shaft 68 by motion of the high range clutch in the second direction not herein utilized. The movement of the shift collars associated with low range clutch 92 and high range clutch 94 is accomplished through conventional means such as the plurality of arms 96 shown in FIG. 4.

Although operation of this transmission should be readily apparent from the aforedescribed structure, it is appropriate to review the operating criteria envisioned for use of transmission 10. It is assumed that input shaft 22 is engine driven while output shaft 78 is interconnected with a vehicle traction means such as wheels or tracks. With all clutches and brakes disengaged as shown in FIG. 1, there is no transmission of power through the transmission. Initially, the vehicle operator will select a speed gear by movement of low range clutch 92 in either the first or second direction or movement of high range clutch 94 in one direction in order to engage one of the plurality of drive gears with the quill shaft 68. It is important to note that such selection is made before the vehicle is in motion and before one of the plurality of brake means in the planetary section is engaged, thus quill shaft 68 is not rotating. The driver then makes a selection of one of the brake means associated with either the planetary gear arrangements 24 or the directional planetary gear arrangement 47. Selection of one of these brake means will rotate the common planet carrier 33 in one or the other direction and thus rotate quill shaft 68. If the operator has selected the forward direction initially by engagement of either brake means 43 or brake means 45, the selected brake means may be deselected and the other of the two forward drive brake means selected in its stead while the vehicle is in a forward motion. It is, of course, understood that initial selection of reverse brake means 57 would require the vehicle to come to a standstill before subsequent selection of either of the two forward brake means.

Figure 4:
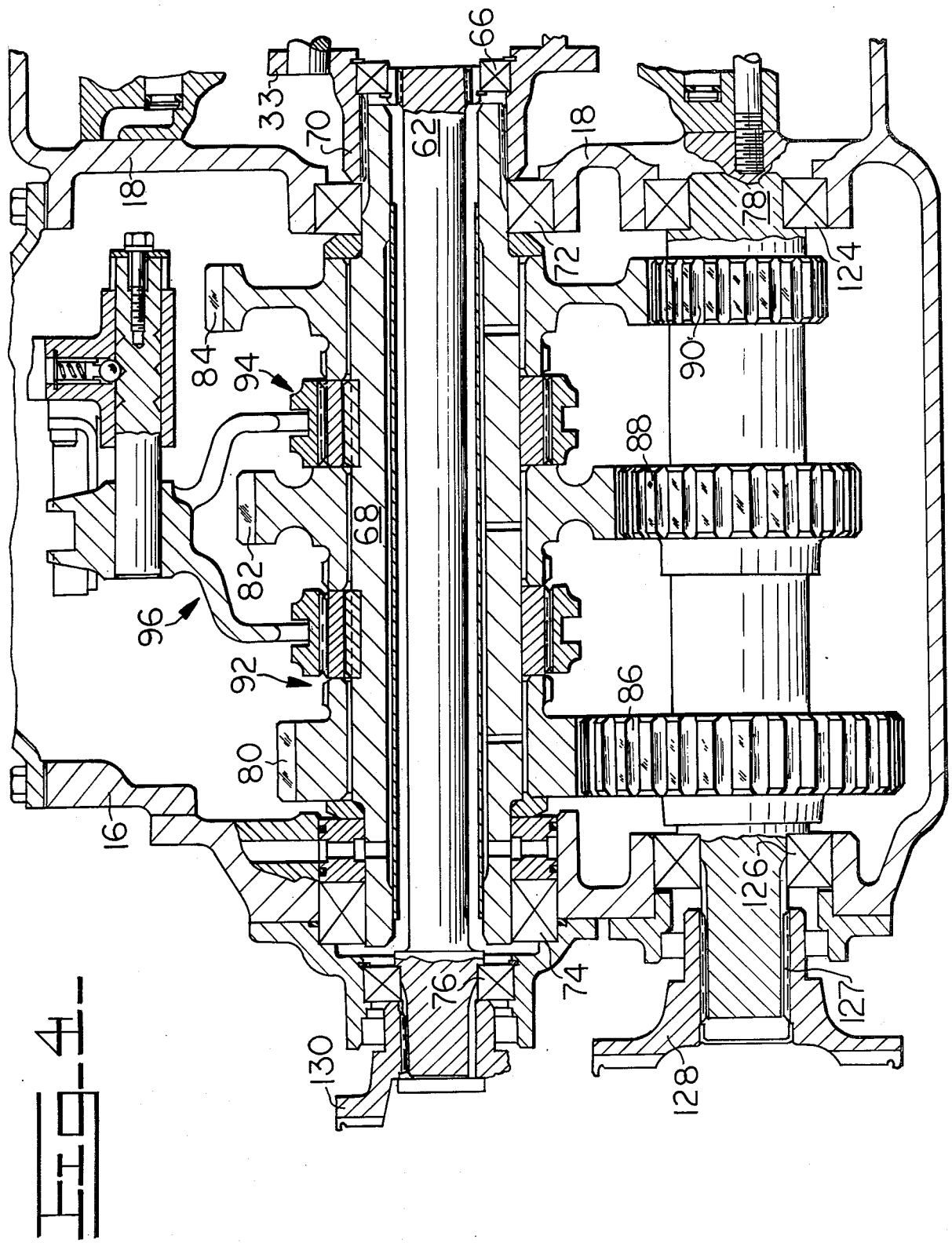
FIG. 4 is the direct drive portion partly in section of the transmission shown in FIG. 3.

Having described the general limitations of this transmission with reference to FIG. 1, reference is made now to FIGS. 3 and 4 for construction of a specific embodiment. Specifically, reference is made to FIG. 3 and the planetary gear arrangements 26 and 28 and the directional planetary gear arrangement 47. As pointed out in the general discussion above, the sun gears of these three planetary gear arrangements are driven by input shaft 22. The structure of the driving mechanism, again as pointed out above, includes a splined sleeve coupling 64 which has integrally formed with it reverse sun gear 49. Splined to the spline sleeve coupling 64 are the low range sun gear 30 and the mid range sun gear 31.

An annular spacer ring 98 may be used to separate and position mid range sun gear 31 relative reverse sun gear 49. Low range sun gear 30 and mid range sun gear 31 may have integrally formed therewith axially extending collars to properly position one relative to other. Again, as previously stated, the splined sleeve coupling 64 is rotatably supported by a bearing means such as bearing 66 between common planet carrier 33 and the spline sleeve coupling. Referring now to the directional planetary gear arrangement 47, the reverse planet carrier 51 is mounted about input shaft 22 and is provided with bearing means such as bearing 100 to allow rotation relative housing 14. Reverse planet carrier 51 has a splined outer perimeter 102 to which an annular brake disc support member 104 is splined. The reverse brake means 57 is comprised of the annular brake disc support member 104, a plurality of interleaved braking discs 106 and a brake piston 108. The plurality of interleaved braking discs 106 are conventional, with one disc being slidably associated with the annular support disc and the next adjacent disc being slidably associated with casing 20. Brake piston 108 is responsive to fluid pressure and is movable to bring the adjacent interleaved braking discs into braking engagement to stop rotation of the annular brake disc support member 104 and reverse planet carrier 51. Brake piston 108 is responsive to fluid pressure provided through passage means 110 in casing 20. As noted above, when reverse brake means 57 is actuated so that reverse planet carrier 51 no longer rotates, reverse ring gear 55 is caused to rotate in a direction opposite that of shaft 22 and thus rotate common planet carrier 33 in a reverse direction.

Low range brake means 43 is of similar construction of the aforedescribed reverse brake means 57. Specifically, a plurality of interleaved braking discs 112 are provided, one disc being slidably associated with ring gear 39 and the next adjacent disc being slidably associated with casing 20. A low range brake piston 114 responsive to fluid pressure provided at passage means 120 is slidably movable in casing 20 to bring the adjacent interleaved braking discs into contact to stop rotation of ring gear 39.

High range brake means 45 is of similar construction to low range brake means 43 and includes a plurality of interleaved braking discs 116 one slidably associated with ring gear 41 and and the next adjacent disc being slidably associated with casing 20. A high range brake piston 118 is responsive to fluid pressure provided at passage 122 to bring the interleaved braking discs 116 into contact to stop rotation of ring gear 41. It is to be understood that an associated control system not described herein would insure that simultaneous operation of any of the three described brake means would not occur.

Referring now to FIG. 4 for a discussion of the construction of the direct drive arrangements, specific attention is directed to output shaft 78 which is journalled between mid wall 18 and a second wall 16. Specifically, the output shaft is supported at mid wall 18 by a bearing means such as bearing 124. A similar bearing means such as bearing 126 is provided at second wall 16. Output shaft 78 transpierces second wall 16 and has affixed by spline means 127 an appropriate drive flange 128 which may be adapted for interconnection with the remaining drive train of the vehicle. A similar drive flange 130 is fitted to power take off shaft 62.

Referring back to FIG. 3, input shaft 22 may be fitted with a hub 132 adapted to drivingly interconnect a vehicle engine flywheel such as flywheel 134 to the input shaft 22. Other means clearly within the skill of the art are equally appropriate for driving transmission 10.

Although this invention has been described with a certain degree of particularly relating to a specific embodiment, it is to be understood that the aforedescribed specification is not to be considered so limited. It is to be understood that changes and modifications to this specification within the skill of the art are within the purview and scope of this invention.

What is claimed is:

1. A vehicle transmission for an engine driven vehicle comprising:
    a housing, including a first wall, a second wall, a mid wall disposed between said first and said second walls, and outer casing means, said first, second, and mid walls extending generally perpendicular to said outer casing means, said outer casing means, said first wall and said second wall for substantially encompassing the transmission;
    input shaft means journalled in and extending through said first wall, said mid wall, and said second wall, and including an input shaft, a splined coupling sleeve, and a power take-off shaft, said power take-off shaft coupled to said input shaft by said splined coupling sleeve;
    a plurality of planetary gear arrangements including a common planet carrier, a low-range planetary gear arrangement, and a high-range planetary gear arrangement, each of said planetary gear arrangements including a sun gear drivingly associated with said input shaft, a plurality of planet gears rotatingly mounted on said common planet carrier, a ring gear, and brake means selectively actuable for stopping rotation of said ring gear so that said common planet carrier rotates at a predetermined speed relative said input shaft, and wherein actuation of said low-range planetary gear arrangement brake means rotates said common planet carrier at a slower speed relative to said input shaft than actuation of said high-range planetary gear arrangement brake means;
    a reverse planetary section including a reverse sun gear drivingly associated with said input shaft, a reverse planet carrier rotatable about said input shaft means, a plurality of reverse planet gears rotatingly mounted on said planet carrier and in intermeshing relationship with said reverse sun gear, a reverse ring gear in intermeshing relationship with said reverse planet gears, and drivingly coupled with said common planet carrier, and a reverse brake means selectively actuable to stop rotation of said reverse planet carrier;
    an intermediate quill shaft coaxially mounted about said input shaft means and driven by said planet carrier;
    an output shaft journalled in and extending from said mid wall through said second wall;
    a low-range speed change means including a low-range drive gear rotatably mounted on said intermediate quill shaft and a low-range driven gear drivingly mounted on said output shaft;
    a mid-range speed change means including a mid-range drive gear rotatably mounted on said intermediate quill shaft, and a mid-range driven gear drivingly mounted on said output shaft;
    a low-range clutch movable in a first direction to drivingly engage said low range drive gear with said intermediate quill shaft and movable in a second direction to drivingly engage said mid-range drive gear with said intermediate quill shaft; and
    a high-range speed change means including a high-range drive gear rotatably mounted on said intermediate quill shaft, a high-range driven gear drivingly mounted on said output shaft, and high-range drive engagement means selectively operable to drivingly engage said high-range drive gear with said intermediate quill shaft.

2. The transmission as set forth in claim 1 wherein said reverse sun gear is integrally formed with said splined coupling sleeve and further wherein said low range sun gear and said high range sun gear are splined externally to said splined coupling sleeve.

3. The transmission as set forth in claim 2 wherein said low range brake means comprises a plurality of interleaved braking discs, one disc slidably associated with the low range gear, and the next adjacent disc slidably associated with the casing, and piston means responsive to fluid pressure, said piston means movable in a first direction to bring said interleaved braking discs into braking engagement whereby rotation of said low range ring gear is stopped.

4. The transmission as set forth in claim 3 wherein said high range braking means comprises a plurality of interleaved braking discs, one disc slidably associated with said high range ring gear and the next adjacent disc slidably associated with the casing, and a high range brake piston responsive to fluid pressure, said high range brake piston movable in a first direction to bring said high range interleaved braking discs into braking engagement whereby rotation of said high range ring gear is stopped.

5. The transmission as set forth in claim 4 wherein said reverse brake means comprises a plurality of interleaved reverse braking discs, one disc slidably associated with the reverse planet carrier, the next adjacent disc slidably associated with the casing, and reverse brake piston means responsive to fluid pressure, said reverse piston means movable in a first direction to bring said reverse braking discs into braking engagement whereby rotation of said reverse planet carrier is stopped.

* * * * *